US008453381B2

(12) United States Patent
Porter

(10) Patent No.: US 8,453,381 B2
(45) Date of Patent: Jun. 4, 2013

(54) SELF-WATERING PLANT CONTAINER AND RELATED METHODS

(76) Inventor: Randy L. Porter, Longwood, FL (US)

( * ) Notice: Subject to any disclaimer, the term of this patent is extended or adjusted under 35 U.S.C. 154(b) by 598 days.

(21) Appl. No.: 12/627,012

(22) Filed: Nov. 30, 2009

(65) Prior Publication Data

US 2010/0139161 A1 Jun. 10, 2010

Related U.S. Application Data

(60) Provisional application No. 61/120,150, filed on Dec. 5, 2008.

(51) Int. Cl.
*A01G 25/00* (2006.01)

(52) U.S. Cl.
USPC ........... 47/79; 47/65.6; 47/65.5; 47/80; 47/65

(58) Field of Classification Search
USPC .................. 47/80, 65.5, 79, 48.5, 62 R, 59 R, 47/31.1, 65, 65.6, 63, 64
See application file for complete search history.

(56) References Cited

U.S. PATENT DOCUMENTS

| | | | | |
|---|---|---|---|---|
| 202,331 | A * | 4/1878 | Conway | 405/36 |
| 499,524 | A * | 6/1893 | Dockery | 405/41 |
| 1,758,941 | A * | 5/1930 | Gibson | 405/37 |
| 2,362,747 | A * | 11/1944 | Duke | 405/41 |
| 2,545,717 | A * | 3/1951 | Voigt | 47/18 |
| 3,603,034 | A * | 9/1971 | Maxwell-Stewart | 47/79 |
| 3,797,253 | A * | 3/1974 | Rodieck | 405/37 |
| 3,896,854 | A * | 7/1975 | Utchell | 137/624.14 |
| 4,083,147 | A | 4/1978 | Garrick | |
| 4,771,572 | A * | 9/1988 | Higa | 47/58.1 R |
| 4,864,771 | A | 9/1989 | Fah | |
| 5,209,015 | A | 5/1993 | De Filippi | |
| 6,219,969 | B1 | 4/2001 | Dion | |
| 6,622,430 | B1 * | 9/2003 | Lai | 47/79 |
| 6,672,007 | B1 | 1/2004 | Lai | |
| 7,832,146 | B2 * | 11/2010 | Gordon | 47/79 |
| 2002/0088177 | A1 | 7/2002 | Gergek | |
| 2003/0106262 | A1 * | 6/2003 | Lai | 47/65.6 |
| 2004/0065010 | A1 * | 4/2004 | Shannon | 47/65.6 |
| 2004/0068931 | A1 * | 4/2004 | Lai | 47/80 |

(Continued)

FOREIGN PATENT DOCUMENTS

| | | |
|---|---|---|
| JP | 3055579 | 5/1991 |
| JP | 4135426 | 5/1992 |

(Continued)

OTHER PUBLICATIONS

International Search Report from the International Bureau mailed Jul. 19, 2010. Entire document.

*Primary Examiner* — Andrea Valenti
(74) *Attorney, Agent, or Firm* — Allen, Dyer, Doppelt, Milbrath & Gilchrist, P.A.

(57) ABSTRACT

A plant container includes a container body having a conduit extending between an inlet connection and an outlet connection. A float valve assembly is in communication with the conduit within the container body for automatically controlling fluid entry into the container body from the conduit. A soil retention element is arranged in the container body above the float valve assembly. A method of using the self-watering plant container includes adding soil to an interior volume of the container body above the soil retention element, planting at least one seed in the soil, and connecting a water supply to an inlet connection of the conduit.

8 Claims, 2 Drawing Sheets

10
14
28
4
4
12
16
18
20

U.S. PATENT DOCUMENTS

2005/0211333 A1 9/2005 Atkinson et al.
2005/0223639 A1* 10/2005 Whitcomb ..................... 47/65.6
2005/0252080 A1 11/2005 Wright
2006/0156626 A1 7/2006 Seaman
2007/0028520 A1 2/2007 Wong
2008/0098651 A1 5/2008 Whisenant
2009/0126269 A1* 5/2009 Wilson et al. ................. 47/62 R

FOREIGN PATENT DOCUMENTS

JP 4158724 6/1992
JP 2000333544 12/2000
JP 2001095402 4/2001
JP 2004283023 10/2004
JP 2005102523 4/2005
WO 2007085799 8/2007

* cited by examiner

SELF-WATERING PLANT CONTAINER AND RELATED METHODS

CROSS-REFERENCE TO RELATED APPLICATION

The present application claims the benefit of U.S. Provisional Application Ser. No. 61/120,150, filed on Dec. 5, 2008, the contents of which application are hereby incorporated by reference in their entirety.

FIELD OF THE INVENTION

The present invention relates to plant containers, and more particularly, to bottom watering plant containers having automatic level control.

BACKGROUND OF THE INVENTION

Bottom watering plant containers are known to offer several advantages over conventional plant containers requiring top watering. For example, there is less loss of water to the surrounding air due to evaporation with bottom watering, and therefore less watering is required to maintain the desired soil moisture levels. Additionally, bottom watering causes less run-off of fertilizers and other soil treatments relative to top watering, resulting in greater retention of fertilizers and other treatments.

Various systems have been proposed to allow automatic bottom watering. For example, U.S. Patent Application Publication No. 2007/0028520 discloses an irrigation system in which float valves are placed in a plurality of plant growth containers. The plant growth containers are connected in parallel to a common water reservoir. However, this system requires a specialized conduit extending from the reservoir, having a plurality of taps permitting the containers to be connected in parallel.

JP4135426 discloses another bottom watering system in which a plurality of planters can be connected in series. However, the plants must be grown in special pots that are placed in the planters. Additionally, the planters must be specially formed with a channel thereunder to allow routing of waterlines between planters.

SUMMARY OF THE INVENTION

In view of the foregoing, it is an object of the present invention to provide an improved self-watering plant container. According to an embodiment of the present invention, a plant container includes a container body having a conduit extending between an inlet connection and an outlet connection. A float valve assembly is in communication with the conduit within the container body for automatically controlling fluid entry into the container body from the conduit. A soil retention element is arranged in the container body above the float valve assembly.

According to a method aspect of the present invention, a method of using a self-watering plant container includes adding soil to an interior volume of the container body above the soil retention element, planting at least one seed in the soil, and connecting a water supply to an inlet connection of the conduit.

These and other objects, aspects and advantages of the present invention will be better appreciated in view of the drawings and the following detailed description of a preferred embodiment.

DETAILED DESCRIPTION OF A PREFERRED EMBODIMENT

Figure 2:
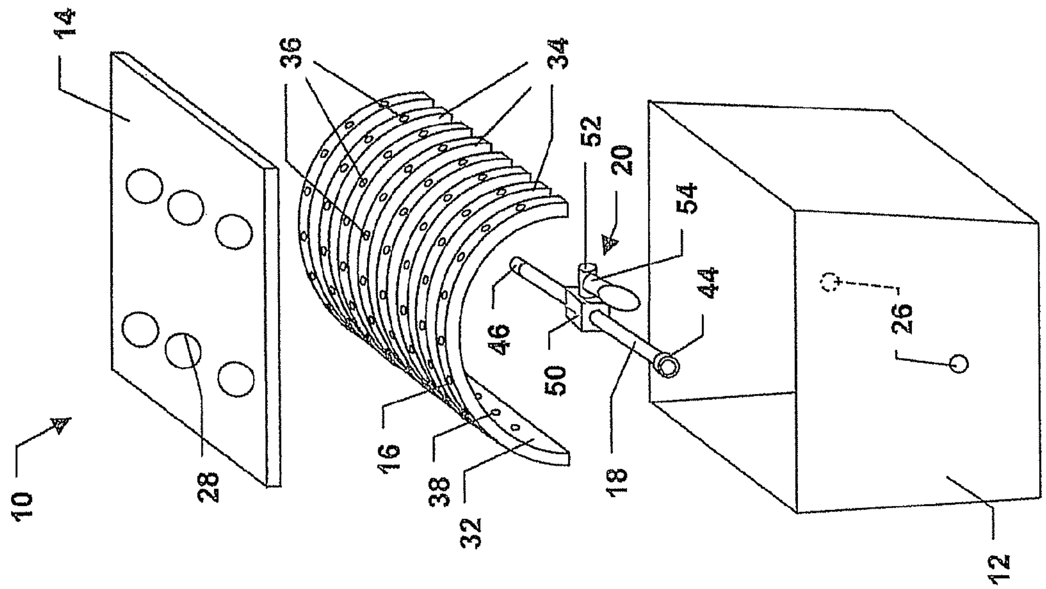
FIG. 2 is a partially exploded perspective view of the container of FIG. 1.
Figure 1:
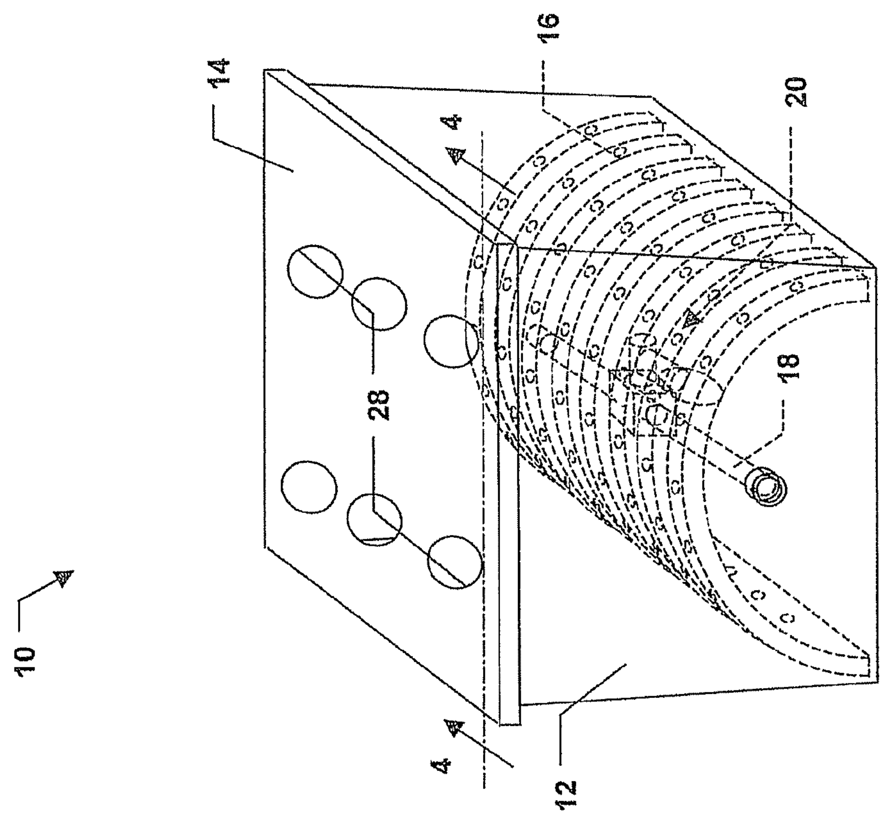
FIG. 1 is a perspective view of a self-watering plant container, according to an embodiment of the present invention, with hidden components shown in broken lines.

Referring to FIGS. 1 and 2, according to an embodiment of the present invention, a self-watering plant container 10 includes a container body 12 having a cover 14. The container 10 further includes a soil retention element 16 arranged within the container body 12 and a conduit 18 extending through the container body 12 with a float valve assembly 20 associated therewith.

The container body 12 is formed with a plurality of sides and a base partially defining an interior volume. Conduit openings 26 are defined in at least two sides of the container body 12. The conduit 18 extends through the openings 26, and the openings 26 are sealed about the conduit 18 such that leakage between the conduit 18 and openings 26 is prevented. The cover 14 is removably affixed over the sides of the container body 12 and has a plurality of plant openings 28 defined therein, allowing communication through the cover 14 into the interior volume of the body 12 when the cover 14 is affixed in place.

Advantageously, the container body 12 and cover 14 can be formed by modifying any of several commercially available plastic storage containers. For example, containers sold under the trademark Rubbermaid® have been found to possess suitable strength and watertightness characteristics. The conduit openings 26 can be readily formed in sides of the container, for instance by cutting, punching or melting. The plant openings 28 can be similarly formed in the cover. Alternately, the cover 14 can be left intact to allow an end user to select custom locations for plant openings 28. Also, a plurality of lines of weakness can be formed in the cover 14 to aid an end user in subsequently punching out plant openings in desired sizes and configurations. Additionally, the cover 14 can be painted or otherwise treated to have heat absorbing or reflecting characteristics. Advantageously, one side of the cover can have heat absorbing characteristics and the opposite side can have heat reflecting characteristics. Also, the cover 14 can be formed of a flexible material or fabric, such as plastic, with an elastic edge for securing the cover 14 over the sides of the container body 12.

Figure 3:
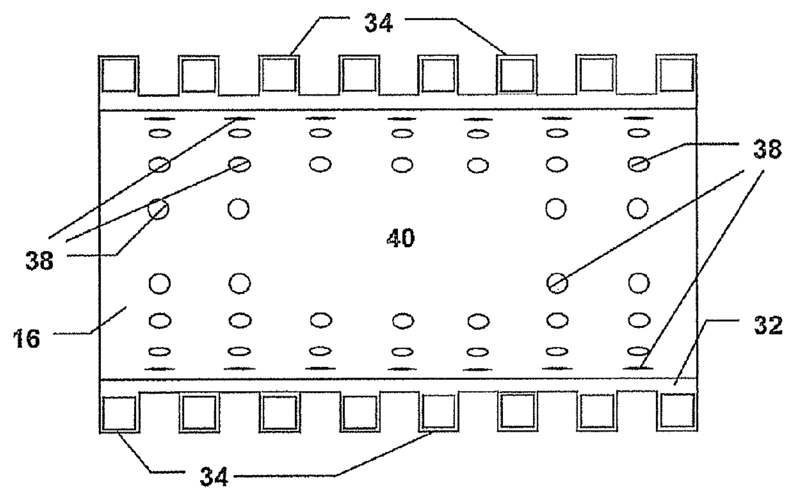
FIG. 3 is a bottom view of a soil retention element of the container of FIG. 1.

Referring to FIGS. 2 and 3, the soil retention element 16 is closely accommodated by the container body 12 and rests on the bottom thereof. The soil retention element 16 is advantageously formed by semi-cylindrical wall 32 with a plurality of corrugations 34, defining hollow interiors, extending around an outer surface of the soil retention element 16.

A plurality of first water openings 36 are formed through outer surfaces of the corrugations 34, allowing communication from outside the soil retention element 16 into the hollow interiors of the corrugations 34. A plurality of second water openings 38 extend through the semi-cylindrical wall 32 between the corrugations 34, allowing communication through the soil retention element 16. To inhibit falling soil from fouling the float valve assembly 20, no openings communicate through the soil retention element in an area 40 directly above the float valve assembly 20.

Advantageously, the soil retention element 16 can be formed from a section of commercially-available corrugated drainage tubing that is cut in half. The water openings 36 and 38 can be readily formed therein, for example, by drilling. Any suitable numbers, sizes and configurations of water openings can be selected. The use of corrugated tubing, with the first water openings 36 in the corrugations, is believed to enhance the transport of water across the soil retention element 16 and into the soil. However, other soil retention elements, for example, non-corrugated tubing, can be used in connection with the present invention.

Referring to Figure, the conduit 18 has an inlet connection 44 and an outlet connection 46 on opposite ends thereof that are accessible outside the conduit openings 26 of the container body 12. The conduit 18 can advantageously be formed from one or more sections of pipe, for example, polyvinyl chloride (PVC) pipe. The inlet and outlet connections 44, 46 can advantageously include standard hose connections. For instance, the inlet connection 44 can include a female-threaded collar that is rotatable relative to the rest of the conduit 18, and the outlet connection 46 can include a male-threaded portion.

Figure 4:
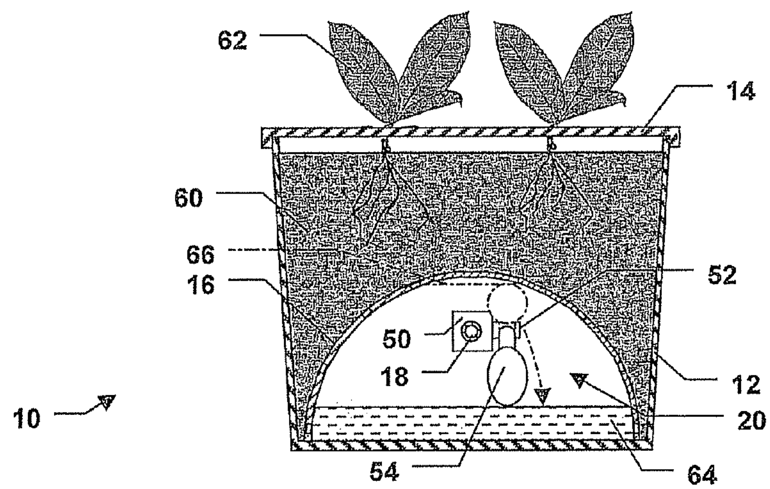
FIG. 4 is a sectional view, taken along line 4-4, of the container of FIG. 1, with water, soil and plants arranged therein, and alternate positions shown in broken lines.

Referring to FIGS. 2 and 4, the float valve assembly 20 includes a junction 50, a water outlet 52 and float valve 54. The junction 50 secures the float valve assembly 20 with the conduit 18. An opening or discontinuity in the conduit 18 in the area of the junction 50 allows flow from the conduit to the water outlet 52 when the float valve 54 is open. The float 54 includes a buoyant element that is displaceable between a lower position (shown in solid lines) in which the float valve 54 is open, and an upper position (shown in broken lines) in which the float valve 54 is closed. Preferably, flow between the inlet and outlet connections 44, 46 of the conduit 18 is not impeded, regardless of the position of the float valve 54.

In operation, soil 60 is placed within the container body 12 above the soil retention element 16. The soil is preferably added in layers and periodically moistened while being added, to eliminate any air pockets and to help facilitate subsequent transport of the water through the soil. Fertilizers and other substances can be added to soil, preferably in a central trough formed in the top layer of soil and then covered with soil.

One or more plants 62 are planted in the soil 60 such that the plants 62 can extend through plant openings 28 (see FIGS. 1 and 2) in the cover 14. The conduit 18 is connected to a water source, such as a water hose tapped into a domestic water supply though an outdoor spigot.

The float valve assembly 20 automatically allows water 64 to enter the container body 12 below the soil retention element 16. When the water reaches an upper limit 66, the float valve assembly 20 automatically stops the entrance of water 64 into the container body 12. Water 64 is able enter the soil 60 by passing up the hollow interiors of corrugations 34 and out first water openings 36, as well as by passing directly through second water openings 38 (see FIGS. 2 and 4). As water 64 is consumed, the level drops and the float valve assembly 20 automatically allows additional water to enter to restore the level.

Figure 5:
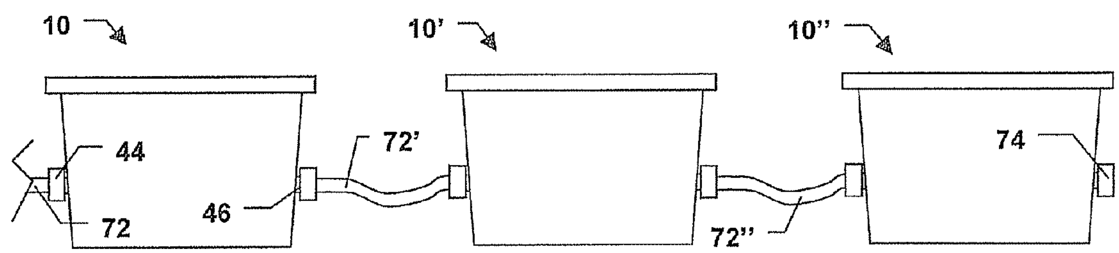
FIG. 5 is a side view of the container of FIG. 1 connected with additional containers.

Referring to FIG. 5, the container 10 can be connected in series with one or more additional containers, for example, containers 10', 10". The inlet connection 44 of the container 10 is connected to a water source, for instance, via a hose 72. A hose 72' extends between the container 10 and the container 10'; likewise, a hose 72" extends between the container 10' and the container 10". A cap 74 is arranged on the end of the container 10". It will be appreciated, however, that additional containers could be connected, or other items. For instance, a garden hose with a conventional nozzle could be attached at the outlet of the last container.

Because the float valve assemblies in respective containers do not impede flow through the respective conduits, automatic level control in each of the containers 10, 10', 10" is independent of the others. Advantageously, it is not necessary for the containers to be arranged on the same level or in any particular order for the automatic level control in each container to function properly.

The above embodiment is provided for exemplary and illustrative purposes. Those skilled in the art will appreciate that the present invention is not necessarily limited to such an embodiment. Rather, numerous modifications, and adaptations for particular circumstances, fall within the scope of the invention as herein shown and described and of the claims appended hereto.

What is claimed is:

1. A self-watering plant container comprising:

a container body having a bottom and at least one wall defining a watertight interior volume with an open top and a pair of conduit openings, the pair of conduit openings being defined in opposite sides of the at least one wall;

a conduit extending through the interior volume between the conduit openings;

a float valve assembly connected to the conduit within the interior volume, and including a float valve controlling fluid communication between the conduit and the interior volume through a float valve fluid outlet; and a soil retention element arranged inside the interior volume over the float valve assembly and the conduit, the soil retention element having a semi-cylindrical wall extending upwardly between opposite edges thereof to cover the float valve assembly and the conduit, wherein a plurality of corrugations with hollow interiors are included on the semi-cylindrical wall, the edges of the soil retention element wall resting directly on the bottom of the container body and extending in parallel with the conduit and terminating at the opposite sides of the at least one container body wall in which the pair of conduit opening are defined;

wherein the conduit terminates in releasable inlet and outlet connections outside the container body adjacent the conduit openings.

2. The container of claim 1, further comprising a cover extending over the open top.

3. The container of claim 1, wherein the float valve assembly is connected to the conduit such that the float valve does not impede flow through the conduit when closed.

4. The container of claim 1, wherein a plurality of openings extend through the soil retention element.

5. The container of claim 4, wherein there are no openings extending through the soil retention element directly over the float valve assembly.

6. The container of claim 1, wherein a first plurality of openings extend into the hollow interiors of the plurality of corrugations.

7. The container of claim 6, wherein a second plurality of openings extend through the semi-cylindrical wall between the plurality of corrugations.

8. The container of claim 1, wherein the float valve is operable to maintain a predetermined water level within the interior volume.

* * * * *